(12) United States Patent
Min (10) Patent No.: US 8,503,570 B2
(45) Date of Patent: Aug. 6, 2013

(54) SYSTEM AND METHOD FOR TRANSMITTING SEAMLESS WIRELESS DATA IN REAL TIME

(75) Inventor: Wi Sik Min, Seoul (KR)

(73) Assignee: Harmonix Co., Ltd., Seoul (KR)

( * ) Notice: Subject to any disclaimer, the term of this patent is extended or adjusted under 35 U.S.C. 154(b) by 0 days.

(21) Appl. No.: 12/743,948

(22) PCT Filed: May 19, 2010

(86) PCT No.: PCT/KR2010/003170
§ 371 (c)(1),
(2), (4) Date: Jun. 9, 2010

(87) PCT Pub. No.: WO2011/129482
PCT Pub. Date: Oct. 20, 2011

(65) Prior Publication Data
US 2013/0022089 A1   Jan. 24, 2013

(30) Foreign Application Priority Data
Apr. 14, 2010   (KR) ........................ 10-2010-0034222

(51) Int. Cl.
*H04L 27/00* (2006.01)
(52) U.S. Cl.
USPC ....................................................... 375/295

(58) Field of Classification Search
USPC .......................................... 375/295, 364, 365
See application file for complete search history.

(56) References Cited

U.S. PATENT DOCUMENTS
7,647,060 B2 * 1/2010 Kawamura et al. ........... 455/502

* cited by examiner

*Primary Examiner* — Kevin Kim
(74) *Attorney, Agent, or Firm* — Murabito Hao & Barnes LLP; Andrew D. Fortney (57) ABSTRACT

A system and method for transmitting seamless wireless data in real time are disclosed. The system includes a transmission device for transmitting wireless data to a reception device in real time. The transmission device includes a packet transmission unit, a communication efficiency detection unit, and a transmission cycle adjustment unit. The packet transmission unit transmits a data packet to the reception device. The communication efficiency detection unit detects communication efficiency of the packet transmission. The transmission cycle adjustment unit adjusts a cycle of the packet transmission according to the detected communication efficiency. It is possible to efficiently transmit seamless wireless data in real time even in a wireless space of a communication environment which varies continuously by continuously monitoring the communication environment of the wireless space where the wireless data is transmitted and adjusting the setting of a communication system to be suitable for the monitored wireless environment.

20 Claims, 8 Drawing Sheets

| DATE RATE (Mbps) | MODULATION | CODING RATE (R) | CODED BITS PER SUBCARRIER ($N_{BPSC}$) | CODED BITS PER OFDM SYMBOL ($N_{CBPS}$) | DATA BITS PER OFDM SYMBOL ($N_{DBPS}$) |
|---|---|---|---|---|---|
| 6 | BPSK | 1/2 | 1 | 48 | 24 |
| 9 | BPSK | 3/4 | 1 | 48 | 36 |
| 12 | QPSK | 1/2 | 2 | 96 | 48 |
| 18 | QPSK | 3/4 | 2 | 96 | 72 |
| 24 | 16QAM | 1/2 | 4 | 192 | 96 |
| 36 | 16QAM | 3/4 | 4 | 192 | 144 |
| 48 | 64QAM | 3/2 | 6 | 288 | 192 |
| 54 | 64QAM | 3/4 | 6 | 288 | 216 |

SYSTEM AND METHOD FOR TRANSMITTING SEAMLESS WIRELESS DATA IN REAL TIME

BACKGROUND OF THE INVENTION

1. Field of the Invention

The present invention relates to a communication system and method, and more particularly to a system and method capable of transmitting seamless wireless data in real time even in a wireless space where a communication environment varies continuously.

2. Description of Related Art

Recently, wireless transmission/reception systems have been widely used to perform wireless communication for various devices within a limited space without using a wired link. In general, the above-described wireless transmission/reception systems perform communication in a wireless space where a communication environment varies continuously.

The variation of communication environment may occur due to various causes such as different communication devices sharing a wireless space, the movement of an object located within a wireless environment, a natural phenomenon, and the like.

On the other hand, it is necessary to maintain the setting of a communication system suitable for a given wireless environment so as to transmit seamless wireless data in real time. For example, it is advantageous to transmit data at high speed when the communication environment is good, but the reliability of data transmission is more important than a transmission rate when the communication environment is not good.

However, the efficiency of communication may be degraded when the initial setting of a communication system is constantly maintained in a communication environment which is varied continuously and hence the real-time transmission of seamless wireless data may be impossible.

SUMMARY OF THE INVENTION

The present invention has been made to solve the above problems of the related art, and an object of the invention is to provide a system and method capable of efficiently transmitting seamless wireless data in real time even in a wireless space of a communication environment which varies continuously.

According to an embodiment of the invention for achieving the above object, there is provided a system for transmitting seamless wireless data in real time. The system includes a transmission device for transmitting wireless data to a reception device in real time. The transmission device includes a packet transmission unit, a communication efficiency detection unit, and a transmission cycle adjustment unit.

The packet transmission unit transmits a data packet to the reception device. The communication efficiency detection unit detects communication efficiency of the packet transmission. The transmission cycle adjustment unit adjusts a cycle of the packet transmission according to the detected communication efficiency.

It is possible to efficiently transmit seamless wireless data in real time even in a wireless space of a communication environment which varies continuously by continuously monitoring the communication environment of the wireless space where the wireless data is transmitted and adjusting the setting of a communication system to be suitable for the monitored wireless environment.

Preferably, the packet transmission cycle may include a packet transmission time of the transmission device, a switching time for switching from a transmission mode of the transmission device to a reception mode, a reception time for a response packet from the reception device, and a switching time for switching from the reception mode of the transmission device to the transmission mode.

Preferably, the packet transmission unit may transmit a header of the packet at a preset minimum bit rate and transmit data of the packet according to adjustment by the transmission cycle adjustment unit. It is possible to improve the reliability of communication by separately employing a bit error rate (BER) of the packet header and a BER of the packet data as described above.

Preferably, the transmission cycle adjustment unit may adjust the packet transmission cycle by selecting one of a plurality of preset packet transmission cycles. It is possible to increase a cycle adjustment rate and reduce a calculation load of the system by selecting one of the preset packet transmission cycles without calculating the packet transmission cycle every time the communication environment is changed.

Preferably, the system may further include a frequency information reception unit for receiving information, regarding a first link frequency for transmitting the packet and a second link frequency as a reserved frequency to which the first link frequency is capable of being changed, from the reception device. Preferably, the frequency information reception unit may receive correction information regarding the second link frequency from the reception device during communication through the first link frequency. According to this configuration, it is possible to transmit seamless wireless data in real time even in continuous interference caused by different electronic devices using the same frequency band.

Preferably, the system may further include an interference detection unit for detecting communication interference at the first link frequency and the second link frequency so as to change a frequency at which the packet is transmitted. Preferably, the interference detection unit may detect the communication interference by a preset interference detection algorithm.

Also, an invention in which the system is implemented by a method is disclosed.

DETAILED DESCRIPTION OF THE INVENTION

Preferred embodiments will now be described with reference to the accompanying drawings.

Figure 1:
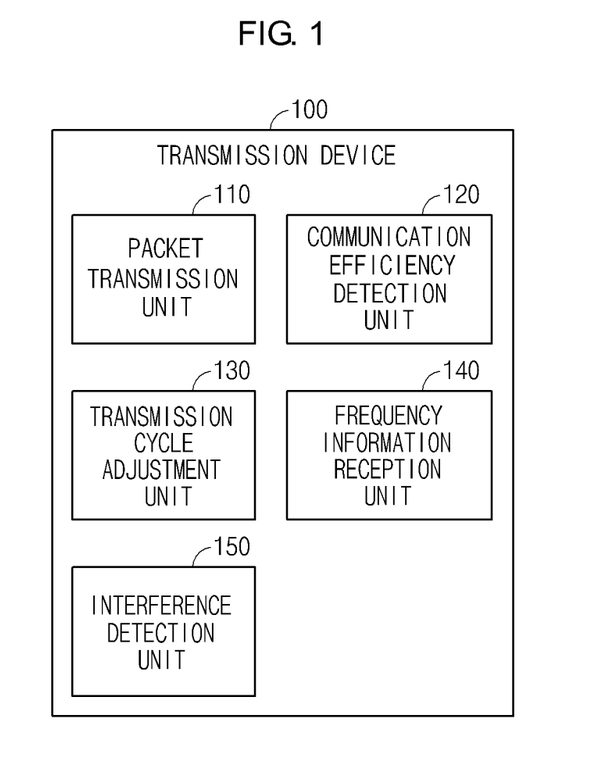
FIG. 1 is a schematic block diagram of an embodiment of a transmission device constituting a system for transmitting seamless wireless data in real time according to the present invention.

FIG. 1 is a schematic block diagram of an embodiment of a transmission device constituting a system for transmitting seamless wireless data in real time according to the present invention.

In FIG. 1, a transmission device 100 includes a packet transmission unit 110, a communication efficiency detection unit 120, a transmission cycle adjustment unit 130, a frequency information reception unit 140, and an interference detection unit 150.

The packet transmission unit 110 transmits a data packet to a reception device (not shown).

At this time, the packet transmission unit 110 may transmit a header of the packet at a preset minimum bit rate and may transmit data of the packet according to adjustment of the transmission cycle adjustment unit 130. It is possible to improve the reliability of communication by separately employing a bit error rate (BER) of the packet header and a BER of the data as described above.

The communication efficiency detection unit 120 detects the communication efficiency of packet transmission. A communication efficiency standard may be preset in the system by a system manufacturer or user.

For example, when a specific unit time of a basic cycle for communication is adopted, the communication efficiency of the system may be calculated by a product of [Ratio obtained by dividing a transmission time by a unit time of a basic cycle] and [1.0−Retransmission ratio at the time of adopting the unit time of the basic cycle].

The transmission cycle adjustment unit 130 adjusts a cycle of packet transmission according to the detected communication efficiency. At this time, the packet transmission cycle may include a packet transmission time of the transmission device, a switching time for switching from the transmission mode of the transmission device to the reception mode, a reception time for a response packet from the reception device, and a switching time for switching from the reception mode of the transmission device to the transmission mode.

Figure 2:
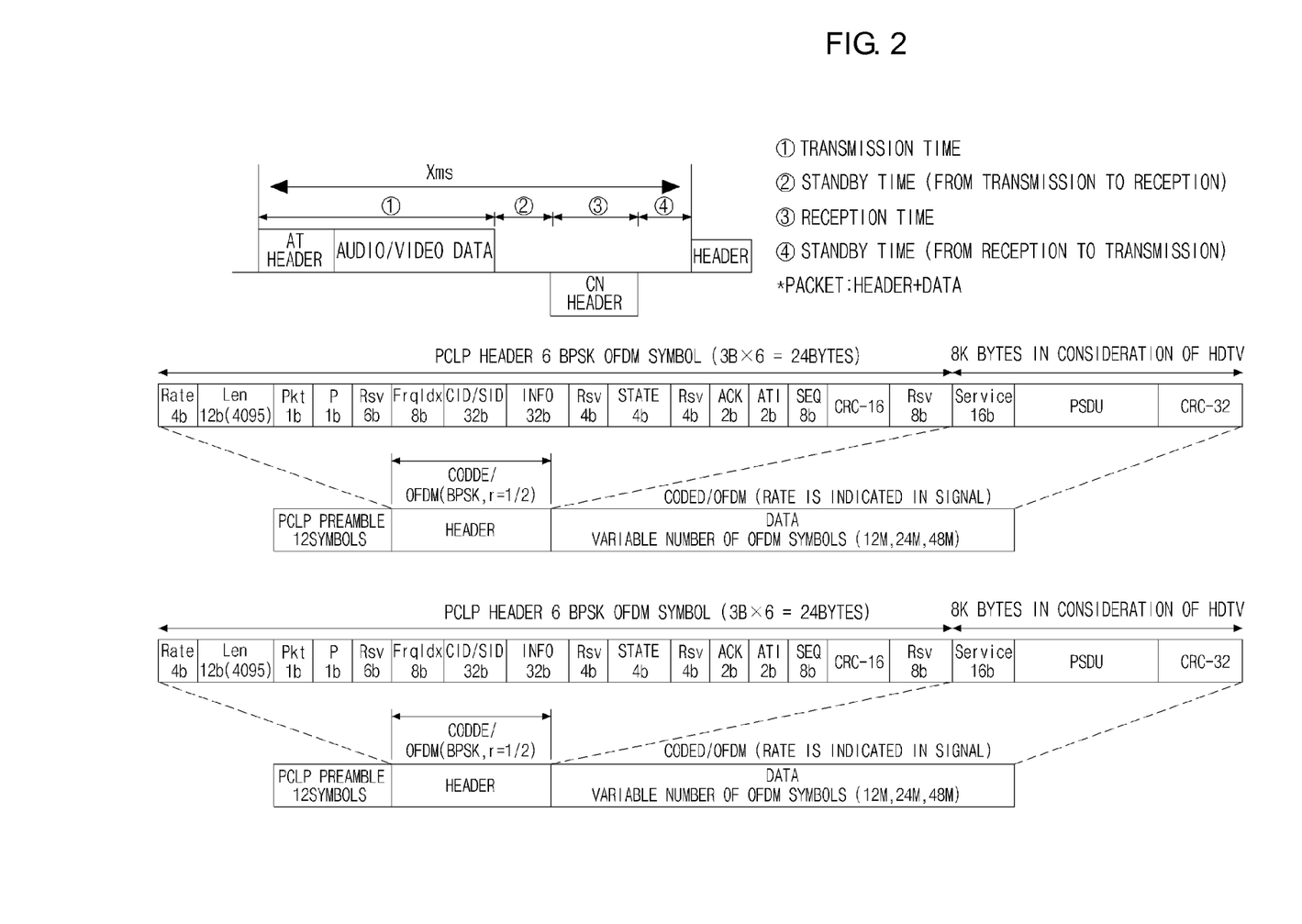
FIG. 2 is a diagram schematically showing the configuration of a unit time of a basic cycle for communication.

FIG. 2 is a diagram schematically showing the configuration of a unit time of a basic cycle for communication.

In FIG. 2, it can be seen that a unit time Xms of a basic cycle for communication is configured by a sum of 1) a transmission time, 2) a system standby time for securely switching from transmission to reception (a stable minimum switching time for IQ DAC and IQ ADC), 3) a reception time, and 4) a system standby time for re-switching from reception to transmission (a stable minimum switching time for IQ ADC and IQ DAC).

The transmission cycle adjustment unit 130 may adjust a cycle of packet transmission by selecting one of a plurality of preset packet transmission cycles. It is possible to increase a cycle adjustment rate and reduce a calculation load of the system by selecting one of the preset packet transmission cycles without calculating the packet transmission cycle every time the communication environment is changed.

When the retransmission ratio is less than 1, the communication efficiency for minimizing the power consumption of the transmission system is increased as the unit time of the basic cycle for communication is increased. However, proper selection is necessary because of the probability of retransmission which intermittently exists in the application of substantially cognitive, real-time, and seamless multimedia communication. For the proper selection, the system may be configured so that one of several basic unit times (for example, 1 ms, 2 ms, 4 ms, and 8 ms) for communication is selectable according to situation.

The frequency information reception unit 140 receives information, regarding a first link frequency for transmitting a packet and a second link frequency as a reserved frequency to which the first link frequency is capable of being changed, from the reception device. The frequency information reception unit 140 may receive correction information for the second link frequency during communication through the first link frequency from the reception device.

According to this configuration, it is possible to transmit seamless wireless data in real time even in continuous interference caused by different electronic devices using the same frequency band.

It is possible to efficiently transmit seamless wireless data in real time even in a wireless space of a communication environment which varies continuously by continuously monitoring the communication environment of the wireless space where the wireless data is transmitted and adjusting the setting of a communication system to be suitable for the monitored wireless environment.

A process in which the transmission device 100 receives frequency information from the reception device and transmits wireless data in real time will be described in more detail as follows.

For a change of a packet transmission frequency, the interference detection unit 150 detects communication interference at the first link frequency and the second link frequency. In this case, the interference detection unit 150 may detect the communication interference by a preset interference detection algorithm.

Figure 3:
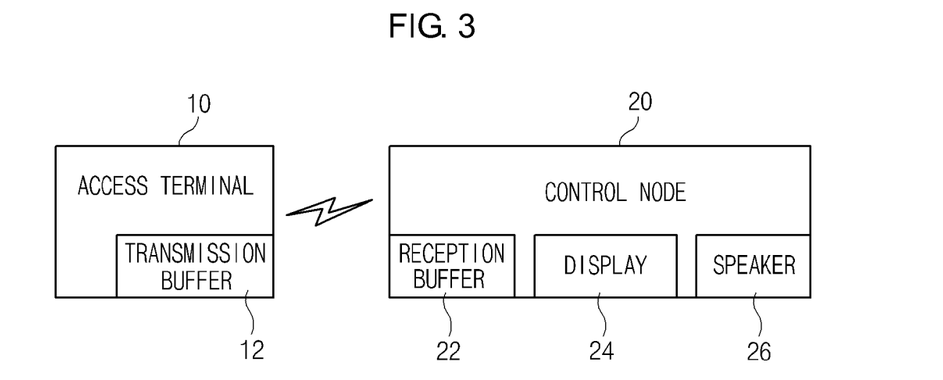
FIG. 3 is a block diagram schematically showing an actual implementation example of the system for transmitting seamless wireless data in real time according to the present invention.

FIG. 3 is a block diagram schematically showing an actual implementation example of the system for transmitting seamless wireless data in real time according to the present invention.

In FIG. 3, the system for transmitting seamless wireless data in real time includes an audio/video transmitter 10 (hereinafter, referred to as access terminal (AT)) as the transmission device 100 and an audio/video receiver 20 (hereinafter, referred to as control node (CN)). The access terminal 10 may be a wireless modem using an OFDM modulation scheme, and the control node 20 may be a host device which wirelessly receives data from the access terminal 10.

In this embodiment, the access terminal 10 and the control node 20 set up a link at a specific frequency for wirelessly transmitting and receiving data and then transmit and receive data using the setup link frequency as a channel. When the channel is interfered with during data transmission/reception, data is transmitted/received using a changed channel after changing a currently-in-use channel to another interference-free frequency.

Figure 4:
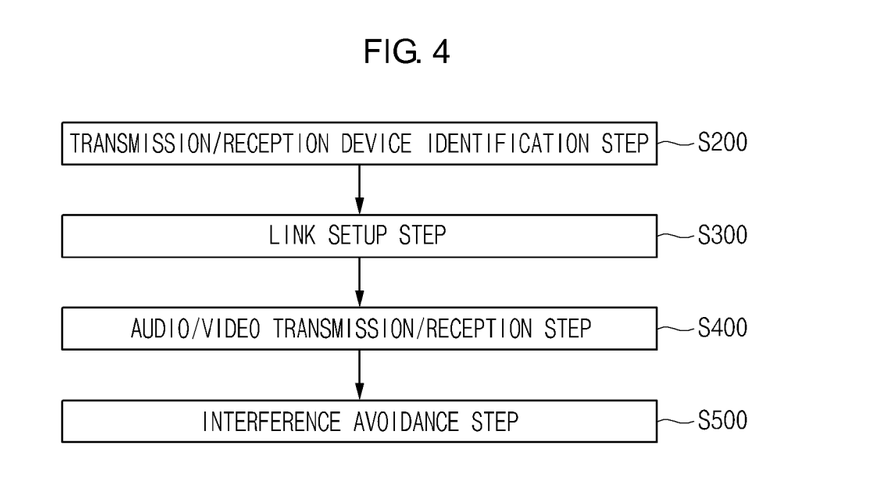
FIG. 4 is a flowchart illustrating a method for transmitting and receiving seamless wireless multimedia in real time in the system of FIG. 3.

FIG. 4 is a flowchart illustrating a method for transmitting and receiving seamless wireless multimedia in real time in the system of FIG. 3.

Referring to FIG. 4, the content of a short-range wireless multimedia transmission/reception method mainly includes 1) a transmission/reception device identification step S200, 2) a link setup step S300, 3) an audio/video transmission/reception step S400, and 4) an interference avoidance step S500. Hereinafter, each step will be more specifically described.

Figure 5:
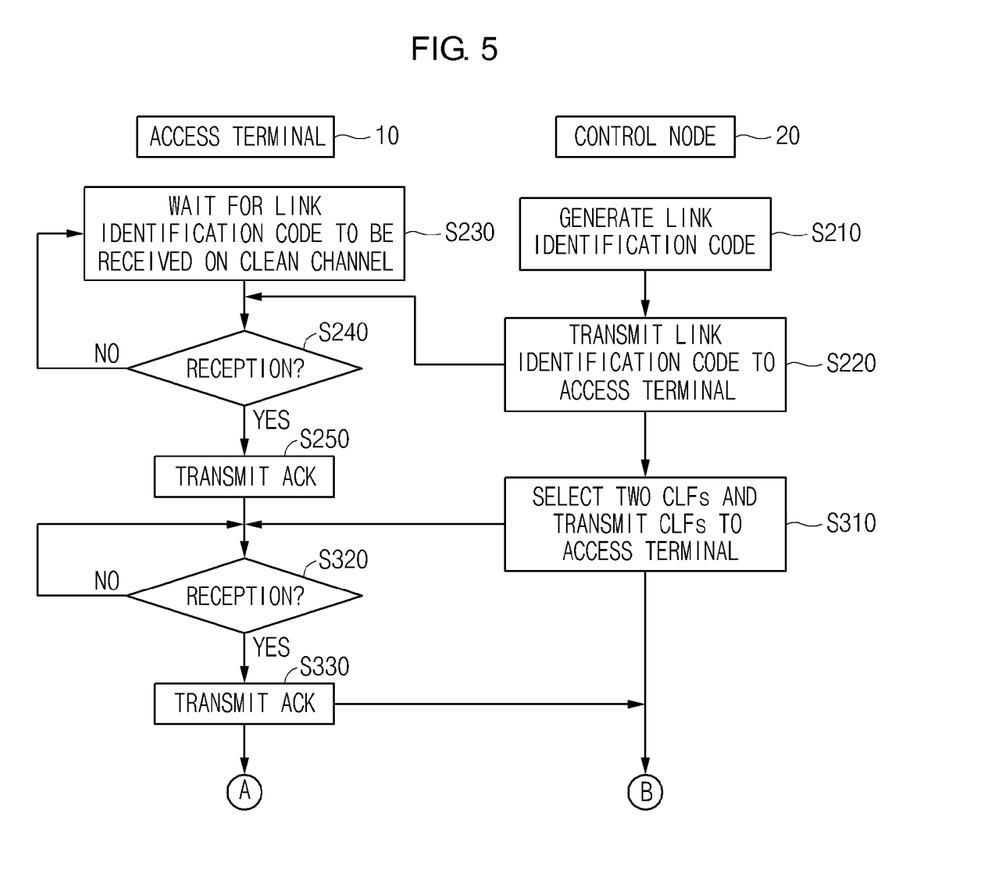
FIG. 5 is a flowchart illustrating a transmission/reception device identification step and a link setup step.

FIG. 5 is a flowchart illustrating the transmission/reception device identification step and the link setup step.

1) Transmission Device Identification Step

The access terminal 10 and the control node 20 share a common link identification code (common id). The link identification code includes information regarding a specific frequency group for setting up a link between the access terminal 10 and the control node 20. Referring to FIG. 5, the control node 20 generates a link identification code at random (S210), and includes the generated link identification code in a packet and transmits the packet to the access terminal 10 (S220).

At this time, the control node 20 transmits the link identification code packet while hopping a frequency within the identification frequency group used in the identification step. The access terminal 10 waits for the link identification code packet to be received from the control node 20 at a clean identification frequency (CIF) (hereinafter, referred to as "clean channel"), which is not currently used by other devices, in the identification frequency group used in the identification step (S230).

That is, according to this embodiment, the access terminal 10 receives the link identification code packet only on the clean channel. Accordingly, there is an advantage in that a continuous interference phenomenon caused by other devices using the same frequency band may be prevented. When the control node 20 transmits the link identification code packet at a frequency corresponding to a clean channel selected by the access terminal 10, the access terminal 10 receives the link identification code packet (S240). The access terminal 10 receiving the link identification code packet transmits an acknowledgement (Ack) to the control node 20 so as to notify that the link identification code packet has been accurately received (S250).

2) Link Setup Step

The control node 20 selects two clean link frequencies (CLFs) within the link frequency group (LFG) from the shared link identification code of the identification step, and transmits the selected clean link frequencies to the access terminal 10 (S310).

Upon receipt of the two clean link frequencies, that is, the first clean link frequency (CLF1) and the second clean link frequency (CLF2), from the control node 20 (S320: Y), the access terminal 10 transmits an acknowledgement (Ack) to the control node 20 (S330). In this specification, the first clean link frequency (CLF1) is a frequency to be used by the access terminal 10 and the control node 20 which transmit and receive an audio/video packet, and the second clean link frequency (CLF2) is a reserved frequency to be used to transmit and receive data in place of the first clean link frequency (CLF1) when the first clean link frequency (CLF1) is interfered with.

3) Multimedia Transmission/Reception Step

Figure 6:
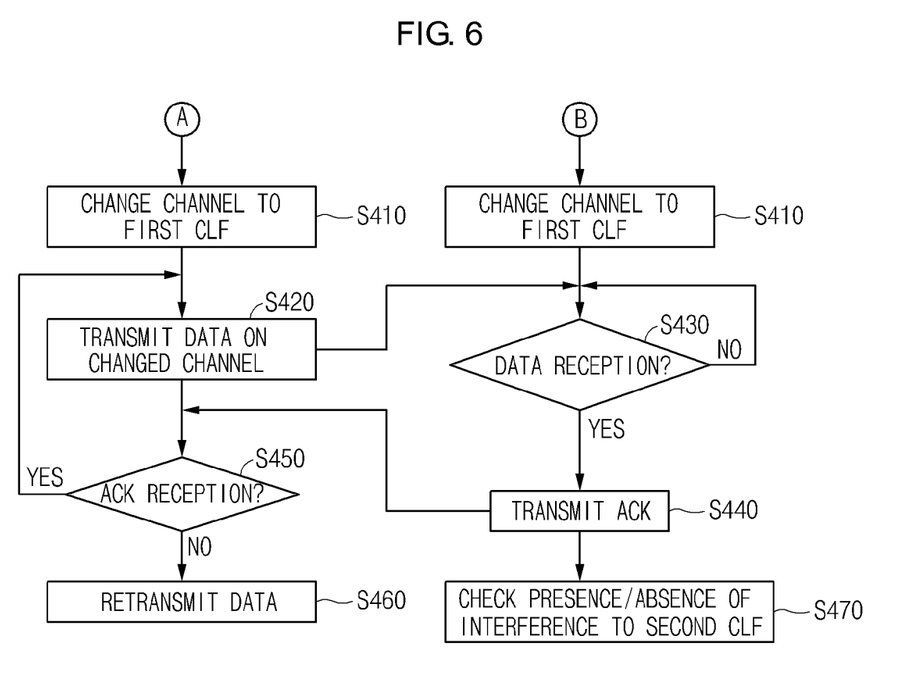
FIG. 6 is a flowchart illustrating a multimedia transmission/reception step.

FIG. 6 is a flowchart illustrating the multimedia transmission/reception step.

Referring to FIG. 6, the access terminal 10 and the control node 20 make a change to a channel for use in multimedia transmission/reception as one clean link frequency (for example, the first clean link frequency) of clean link frequencies shared in the link setup step (S410). The access terminal 10 starts to transmit multimedia on the changed channel (S420).

When the control node 20 receives the multimedia from the access terminal 10 (S430: Y), the control node 20 starts to record the received multimedia to a reception buffer 22. When an amount of data of the reception buffer 22 exceeds a threshold value, the multimedia recorded to the reception buffer 22 are output through a display 24 and a speaker 26.

The control node 20 transmits an acknowledgement (Ack) at the first clean link frequency (CLF1) in response to a multimedia packet received from the access terminal 10 (S440). When no acknowledgement is received from the control node 20 in response to the multimedia packet transmitted to the control node 20 (S450: N), the access terminal 10 performs a mechanism of retransmitting the multimedia packet (S460). After transmitting the acknowledgement at the first clean link frequency (CLF1) in response to the multimedia packet received from the access terminal 10, the control node 20 changes the frequency to the second clean link frequency (CLF2) and then checks the presence/absence of interference to the second clean link frequency (CLF2) (S470).

Figure 7:
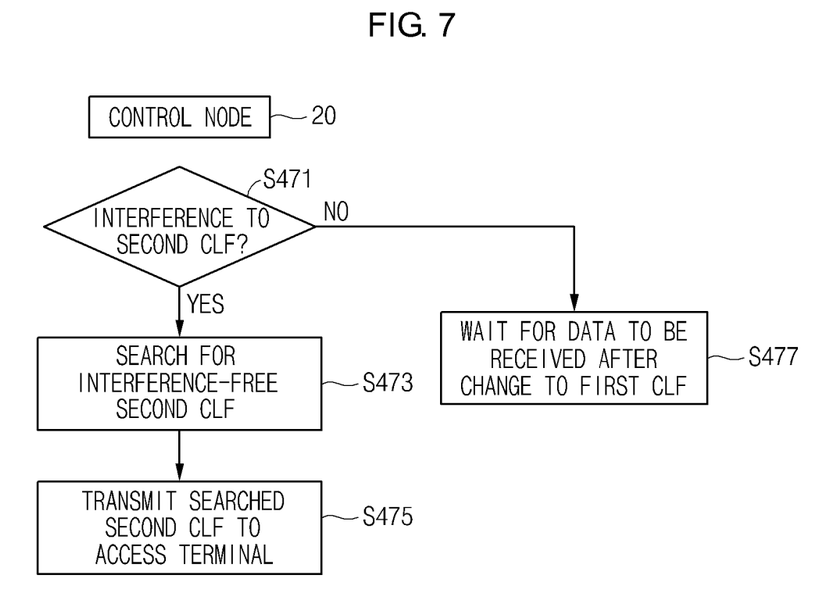
FIG. 7 is a flowchart illustrating a process of checking the presence/absence of interference to a second CLF.

FIG. 7 is a flowchart illustrating a process of checking the presence/absence of interference to the second CLF.

Referring to FIG. 7, when it is determined that there is no interference to the second clean link frequency (CLF2) (S471: N), the control node 20 re-changes the frequency to the first clean link frequency (CLF1) and then waits for a multimedia packet to be received from the access terminal 10 (S477). When it is determined that there is interference to the second clean link frequency (CLF2) (S471: Y), the control node 20 continuously performs an operation of searching for an interference-free clean link frequency within the link frequency group (LFG) (S473), and loads information regarding the searched clean link frequency to an Ack packet and transmits the Ack packet to the access terminal 10 (S475).

That is, the control node 20 loads the information regarding the second clean link frequency to the Ack packet using a piggyback scheme and continuously transmits the Ack packet to the access terminal 10. Accordingly, the access terminal 10 and the control node 20 may share the second clean link frequency constantly updated as an interference-free clean channel.

The access terminal 10 continuously receiving the second clean link frequency from the control node 20 verifies whether there is frequency interference to the second clean link frequency (CLF2) received from the control node 20. At this time, a verification method may be the same as in the control node 20. In order to prevent in advance a near-far problem, the access terminal 10 re-verifies the interference-free second clean link frequency (CLF2) searched for by the control node 20.

When the second clean link frequency (CLF2) verified by the access terminal 10 is not a clean channel, that is, when there is interference to the received second clean link frequency (CLF2), the access terminal 10 performs piggyback transmission by making an indication that the second clean link frequency (CLF2) is not available in an audio/video packet. Upon receipt of the audio/video packet including information indicating that the second clean link frequency (CLF2) is not available, the control node 20 re-performs an operation of finding an interference-free second clean link frequency in the same method as described with reference to FIG. 7.

4) Interference Avoidance Step

When there is continuous interference while the access terminal 10 and the control node 20 transmit and receive a multimedia packet using the first clean link frequency (CLF1), the second clean link frequency (CLF2) is used as a multimedia packet transmission/reception channel in place of the first clean link frequency (CLF1). At this time, a process of finding a reserved clean link frequency other than the frequency used as the transmission/reception channel is the same as that described in the above-described 3) Multimedia Transmission/Reception Step. A process of determining whether or not there is interference during multimedia packet transmission/reception is as follows.

First, in the point of view from the access terminal 10, the access terminal 10 determines that interference has occurred when an acknowledgement is not received in response to a multimedia packet transmitted to the control node 20 and an amount of transmission multimedia data with which the transmission buffer 12 of the access terminal 10 is filled exceeds the threshold value.

Otherwise, the control node 20 determines that interference has occurred when a multimedia packet is not received from the access terminal 10, while multimedia data is provided from the reception buffer 22 to the display 24 and the speaker 26 in a state in which the reception buffer 22 is full with data, and an amount of data stored in the reception buffer 22 is equal to or less than the threshold value.

The determination of presence/absence of interference may be made by an interference embedded detection algorithm of a micro-controller within the system. For example, when an acknowledgement (Ack) signal is not continuously received several times (3 to 4 times), it may be determined that interference has occurred. It is possible to command software to change a frequency using a program of the micro-controller input by a user.

Audio information input at a fixed transmission rate is used to determine a channel interference level from a state of the transmission buffer 12 or the reception buffer 22. This is because it is difficult to easily determine the channel interference level from compressed video data variably input according to motion of video. Accordingly, an audio buffer and a video buffer are separately managed in this embodiment.

Figure 8:
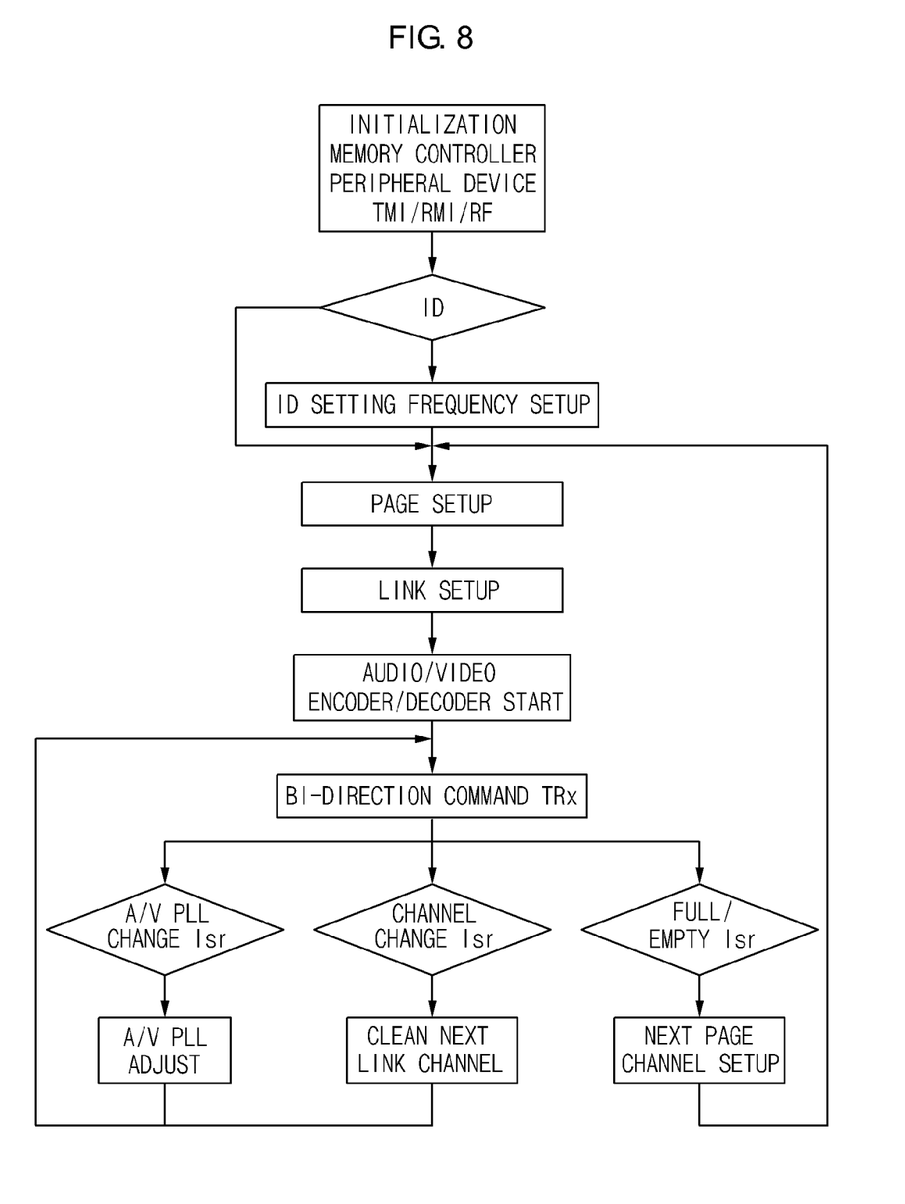
FIG. 8 is a flowchart schematically showing an initial connection process of the system for transmitting seamless wireless data in real time according to the present invention.
Figure 9:
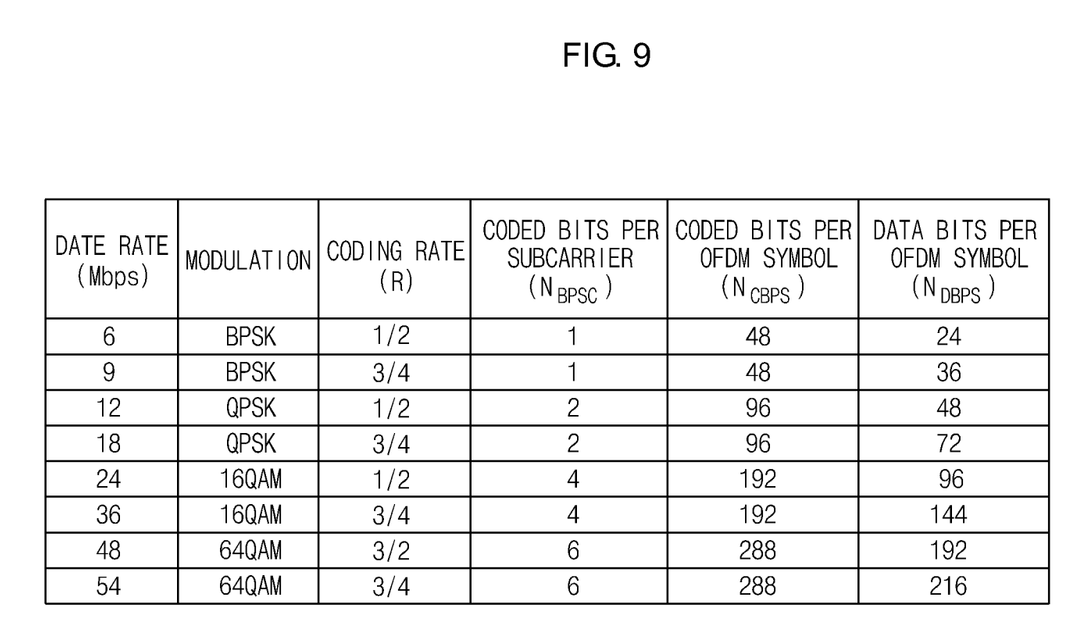
FIG. 9 is a table showing various transmission modes and transmission rates in the system for transmitting seamless wireless data in real time according to the present invention.

FIG. 8 is a flowchart schematically showing an initial connection process of the system for transmitting seamless wireless data in real time according to the present invention, and FIG. 9 is a table showing various transmission modes and transmission rates in the system for transmitting seamless wireless data in real time according to the present invention.

This specification discloses a method for seamlessly transmitting/receiving wireless digital multimedia in real time. In order to effectively seamlessly transmit/receive wireless digital multimedia in real time, OFDM of a wideband multicarrier scheme in which the reliability of communication is most excellent even under a poor wireless communication environment and in which the wireless communication of multimedia is possible is used as a basic communication scheme.

In this case, real-time, seamless, and digital wireless communication is implemented by appropriately setting a unit time of a basic cycle for communication in which a transmitter transmits a data packet and checks the presence/absence of reception using a time division scheme such as a TDMA scheme, and by most efficiently setting the configuration of a transmission time, a reception time, and a standby time within the unit time of the basic cycle for communication.

The rationalization of transmission output according to communication distance is made by performing communication after deciding a most efficient unit time of a basic cycle for communication and a most efficient packet size in consideration of a modulation scheme and a code rate using information regarding an error rate of a packet header and an error rate of packet data by an RSSI (Received Signal Strength Indicator) and CRC (Cyclical Redundancy Check).

To implement the above, first, it is necessary to configure a packet capable of maximizing the reliability of wireless communication. In this case, a header is transmitted at a minimum bit rate using a modulation scheme/code rate having the highest reliability of communication and data is transmitted in a modulation scheme/code rate suitable for an environment.

Second, when a transmission frequency is selected, a transmission output is adjusted so that reliable communication is maintained in a minimum transmission output by comparing RSSI information to an MDS (minimum discernable signal) of a reception system corresponding to a bit rate of a header. At this time, a unit time of a basic cycle for communication is optimized in consideration of transmission efficiency and a retransmission ratio so as to improve the efficiency of transmission and minimize the power consumption.

The present invention has the following features.

1) System (SoC) using a combination of an OFDM communication scheme and a TDMA communication scheme for seamless wireless multimedia communication 2) System (SoC) separately using a header BER and a data BER of a packet for seamless wireless multimedia communication 3) System (SoC) designed to enable a plurality of unit times of a basic cycle for communication to be set for seamless wireless multimedia communication 4) System (SoC) for maximizing the reliability of communication by testing the efficiency of a preset unit time of a basic cycle for communication in real time or periodically According to the present invention, it is possible to efficiently transmit seamless wireless data in real time even in a wireless space of a communication environment which varies continuously.

Also, it is possible to transmit seamless wireless data in real time even in continuous interference caused by different electronic devices using the same frequency band.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A system for transmitting seamless wireless data in real time, comprising:
 a transmission device for transmitting wireless data to a reception device in real time,
 wherein the transmission device includes:
 a packet transmission unit for transmitting a data packet to the reception device;
 a communication efficiency detection unit for detecting communication efficiency of the packet transmission; and
 a transmission cycle adjustment unit for adjusting a cycle of the packet transmission according to the detected communication efficiency,
 wherein the packet transmission unit transmits a header of the data packet at a preset minimum bit rate and transmits data of the data packet according to an adjustment by the transmission cycle adjustment unit.

2. The system according to claim 1,
 wherein the packet transmission cycle includes a packet transmission time of the transmission device, a switching time for switching from a transmission mode of the transmission device to a reception mode, a reception time for a response packet from the reception device, and a switching time for switching from the reception mode of the transmission device to the transmission mode.

3. The system according to claim 1,
 wherein the transmission cycle adjustment unit adjusts the packet transmission cycle by selecting one of a plurality of preset packet transmission cycles.

4. The system according to claim 1, further comprising:
a frequency information reception unit for receiving information, regarding a first link frequency for transmitting the packet and a second link frequency as a reserved frequency to which the first link frequency is capable of being changed, from the reception device.

5. The system according to claim 4,
wherein the frequency information reception unit receives correction information regarding the second link frequency from the reception device during communication through the first link frequency.

6. The system according to claim 5, further comprising:
an interference detection unit for detecting communication interference at the first link frequency and the second link frequency so as to change a frequency at which the packet is transmitted.

7. The system according to claim 6,
wherein the interference detection unit detects the communication interference by a preset interference detection algorithm.

8. A method for transmitting seamless wireless data in real time, comprising the steps of:
by a transmission device for transmitting wireless data to a reception device in real time,
transmitting a data packet to the reception device;
detecting communication efficiency of the packet transmission; and
adjusting a cycle of the packet transmission according to the detected communication efficiency, wherein a header of the data packet is transmitted at a preset minimum bit rate and data of the data packet is transmitted according to packet transmission cycle adjustment.

9. The method according to claim 8,
wherein the packet transmission cycle includes a packet transmission time of the transmission device, a switching time for switching from a transmission mode of the transmission device to a reception mode, a reception time for a response packet from the reception device, and a switching time for switching from the reception mode of the transmission device to the transmission mode.

10. The method according to claim 8,
wherein the packet transmission cycle is adjusted by selecting one of a plurality of preset packet transmission cycles.

11. The method according to claim 8, further comprising the step of:
receiving information, regarding a first link frequency for transmitting the packet and a second link frequency as a reserved frequency to which the first link frequency is capable of being changed, from the reception device.

12. The method according to claim 11, further comprising the step of:
receiving correction information regarding the second link frequency from the reception device during communication through the first link frequency.

13. The method according to claim 12, further comprising the step of:
detecting communication interference at the first link frequency and the second link frequency so as to change a frequency at which the packet is transmitted.

14. The method according to claim 13,
wherein the communication interference is detected by a preset interference detection algorithm.

15. A system for transmitting seamless wireless data in real time, comprising:
a transmission device for transmitting wireless data to a reception device in real time, wherein the transmission device includes:
a packet transmission unit for transmitting a data packet to the reception device;
a communication efficiency detection unit for detecting communication efficiency of the packet transmission;
a transmission cycle adjustment unit for adjusting a cycle of the packet transmission according to the detected communication efficiency; and
a frequency information reception unit for receiving information from the reception device, the information regarding a first link frequency for transmitting the packet and a second link frequency as a reserved frequency to which the first link frequency is capable of being changed from the reception device.

16. The system according to claim 15,
wherein the frequency information reception unit receives correction information regarding the second link frequency from the reception device during communication through the first link frequency.

17. The system according to claim 16,
wherein the packet transmission unit transmits a header of the packet at a preset minimum bit rate and transmits data of the packet according to adjustment by the transmission cycle adjustment unit.

18. The system according to claim 16, further comprising:
an interference detection unit for detecting communication interference at the first link frequency and the second link frequency so as to change a frequency at which the packet is transmitted.

19. The system according to claim 18,
wherein the interference detection unit detects the communication interference by a preset interference detection algorithm.

20. The system according to claim 15, wherein the packet transmission cycle includes a packet transmission time of the transmission device, a switching time for switching from a transmission mode of the transmission device to a reception mode, a reception time for a response packet from the reception device, and a switching time for switching from the reception mode of the transmission device to the transmission mode.

* * * * *